United States Patent [19]
Webb et al.

[11] Patent Number: 5,510,833
[45] Date of Patent: Apr. 23, 1996

[54] METHOD AND APPARATUS FOR TRANSFORMING COORDINATE SYSTEMS IN AN AUTOMATED VIDEO MONITOR ALIGNMENT SYSTEM

[75] Inventors: James R. Webb, Boulder; Gregory A. Kern, Louisville, both of Colo.

[73] Assignee: Display Laboratories Inc., Boulder, Colo.

[21] Appl. No.: 258,695

[22] Filed: Jun. 13, 1994

[51] Int. Cl.⁶ .................................................. H04N 17/04
[52] U.S. Cl. .......................................................... 348/190
[58] Field of Search ................................... 348/190, 189, 348/191, 180; H04N 17/04

[56] References Cited

U.S. PATENT DOCUMENTS

| | | | |
|---|---|---|---|
| 3,995,269 | 11/1976 | Schumacher | 343/5 EM |
| 4,523,188 | 6/1985 | Huber | 340/734 |
| 4,654,706 | 3/1987 | Davidson et al. | 348/190 |
| 4,672,275 | 6/1987 | Ando | 348/190 |
| 4,757,239 | 7/1988 | Starkey, IV | 348/190 |
| 4,817,038 | 3/1989 | Knoll et al. | 364/413.24 |
| 4,857,998 | 8/1989 | Tsujihara et al. | 348/190 |
| 4,897,721 | 1/1990 | Young et al. | 348/190 |
| 4,952,851 | 8/1990 | Macaulay | 348/190 |
| 5,216,504 | 6/1993 | Webb | 348/190 |

FOREIGN PATENT DOCUMENTS

| | | | |
|---|---|---|---|
| 0404700 | 12/1990 | European Pat. Off. | H04N 17/04 |
| 0448267 | 9/1991 | European Pat. Off. | H04N 17/04 |
| 0257096 | 11/1986 | Japan | H04N 17/04 |

*Primary Examiner*—Tommy P. Chin
*Assistant Examiner*—Vu Le
*Attorney, Agent, or Firm*—William J. Kubida; Holland & Hart

[57] ABSTRACT

A system for transforming coordinate systems in an automated video monitor alignment system includes a camera and computer to capture an image of the display bezel surrounding the cathode ray tube and of the image displayed on the CRT. Three dimensional models of the CRT tube and display bezel are used to compute and compensate for camera perspective. Camera pixel data can then be transformed to 'flat plane' coordinates. When the relative orientation of the camera and CRT are corrected for, the effects of parallax can be eliminated, allowing more accurate inspection, measurement, and lower cost fixturing on the production line. Thus, an accurate coordinate transformation from a camera-referenced coordinate system to a monitor-referenced coordinate system is made.

12 Claims, 4 Drawing Sheets

METHOD AND APPARATUS FOR TRANSFORMING COORDINATE SYSTEMS IN AN AUTOMATED VIDEO MONITOR ALIGNMENT SYSTEM

This invention relates generally to video monitors and automatic alignment systems for video monitors, particularly automatic alignment systems including a camera for capturing an image of a displayed image on the monitor and accurately computing physical characteristics of the displayed image relative to the monitor by transforming coordinate systems.

BACKGROUND OF THE INVENTION

During assembly of video monitors, it is necessary to adjust certain parameters of the video monitor to achieve desired displayed characteristics in the displayed image of the monitor. Traditionally, video monitors have been adjusted by skilled operators in the factory prior to shipment to the customer. Manual adjustment of the monitor, however, is fraught with several problems. First of all, manual adjustment has meant manual measurement of physical characteristics of the displayed image, often with a tape measure. Consequently, the accuracy of the measurement and adjustment is greatly dependent upon the skill of the operator. In addition, operator fatigue plays a role in inaccurate adjustments. Third, consistent, objective and repeatable adjustments are unlikely with the manual system.

Another method for measurement of the physical characteristics of the displayed image uses optics and/or a light sensor mounted on an x-y positioning platform. This method can be very accurate but requires precise alignment of the measuring system to the CRT display. This method is also very slow and not applicable for production or manufacturing facilities for monitors where speed of adjustment is a driving factor.

U.S. Pat. No. 5,216,504, issued to the assignee of the present application, discloses an "Automatic Precision Video Monitor Alignment System." This system involves a single camera placed in front of a video monitor to capture a displayed image which is then supplied to a video board of a computer for analysis of the physical characteristics of the displayed image. The camera also captures an image of the display bezel which limits the outer boundary of the light-emitting area on the CRT. The bezel may be in the form of a shadow mask, an aperture grill, a display bezel or faceplate, or the like. The four inner corners of the bezel are ascertained and a two-dimensional, interpolative correction is made for camera/monitor misalignment. However, such an approach is limited in its accuracy and angular independence. This is mostly due to the use of a two-dimensional approach to compensate for a three-dimensional geometry of the CRT. Further, there are refraction errors due to the curvature and glass thickness of the CRT.

It is against this background and the desire to improve on the prior art techniques that the present invention has been developed.

SUMMARY OF THE INVENTION

A method of the present invention for transforming coordinate systems in an automated video monitor alignment system includes the steps of capturing a camera image of the video monitor and its displayed imaged, converting the captured camera image to a format suitable for processing by a computer, processing the converted image to determine certain characteristics of the converted image, and transforming location coordinates of preselected portions of the converted image into the coordinate system of the image displayed on the monitor.

The apparatus of the present invention for transforming coordinate systems in an automated video monitor alignment system includes means for capturing a camera image of the video monitor and its displayed imaged, means for converting the captured camera image to a format suitable for processing by a computer, means for processing the converted image to determine certain characteristics of the converted image, and means for transforming location coordinates of preselected portions of the converted image into the coordinate system of the image displayed on the monitor.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

DESCRIPTION O THE PREFERRED EMBODIMENT

Figure 1:
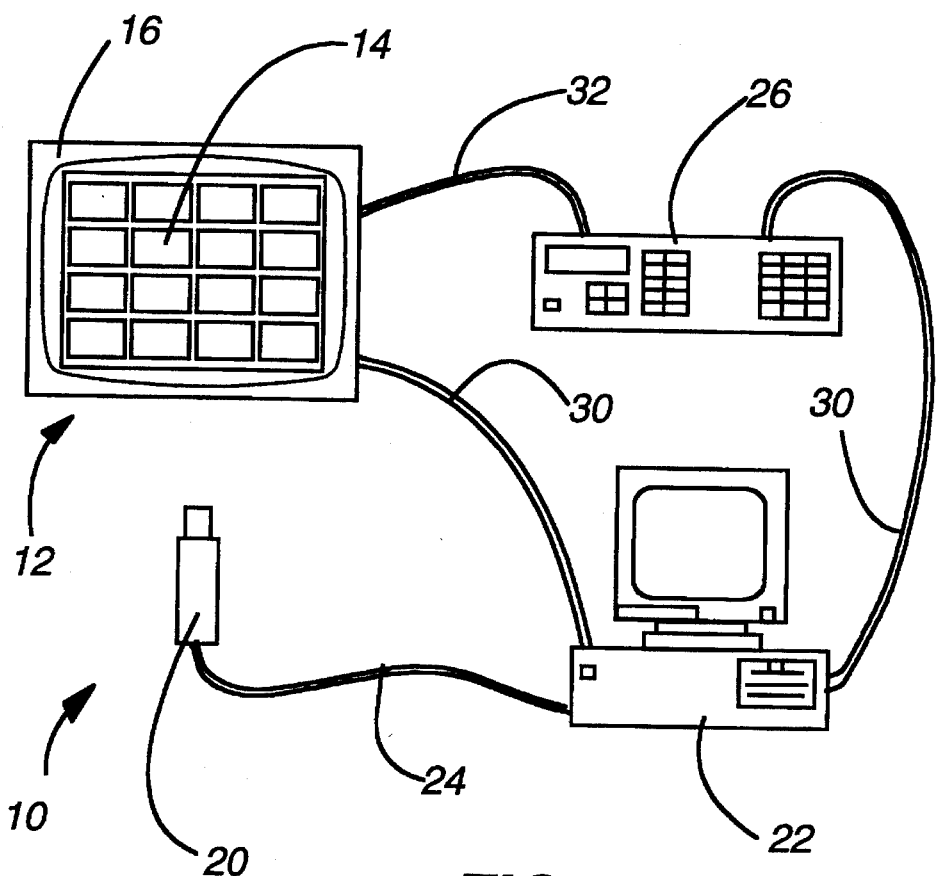
FIG. 1 is a block diagram of the system of the present invention for transforming coordinate systems in an automated video monitor alignment system.

A method and apparatus or system 10 of the present invention for transforming coordinate systems in an automated video monitor alignment system utilizes a single camera system. As shown in FIG. 1, the system 10 includes a video monitor 12 which itself includes a cathode ray tube 14 (CRT) and its associated bezel 16, which may be an aperture grill, a shadow mask, a display bezel or faceplate, or the like, as discussed above. A solid-state camera 20 is placed in front of the monitor 12 to capture an image of the displayed image. The camera is connected to a conventional video board (not shown) in a modified personal computer 22 where a video signal 24 from the camera is processed in a conventional manner into a format suitable for processing by the computer. The computer communicates with the video monitor and with a video signal generator 26 through RS-232 ports 30. The video signal generator supplies a color video signal 32 to the video monitor. The computer may receive a configuration signal from the monitor which informs the computer of the size of the monitor, thickness of the glass of the CRT, shape and relative position of the glass and phosphor within the CRT and other pertinent data. Alternatively, the computer may receive this information about the monitor configuration from another source, such as a disk.

It is important to minimize the need for precise camera/video monitor fixturing and to present results in 'flat plane' units of measure. In order to solve both of these problems, the system of the present invention applies several mathematical models when measurements are made. These include models of the tube surfaces, phosphor and faceplate, the plastic bezel shape, and formulas to convert from coordinates in camera pixels to 'flat plane' units.

The general method of using some part of the monitor (e.g. bezel, be it a shadow mask, a faceplate or an aperture grill) as reference for measurement is disclosed in U.S. Pat. No. 5,216,504, issued to the assignee of the present invention, which is incorporated herein by reference.

This application describes one of the tube models and the formulas needed to convert from camera pixel to 'flat plane' coordinates. This modelling is needed when inspecting the geometry of a pattern displayed on a CRT. Edge measurements of a particular pattern are made in camera pixel coordinates. The camera pixel coordinates are then transformed to a 'flat plane' frame of reference in millimeters. This transformation takes into account the effect of the camera's perspective, and eliminates the effects of parallax.

The system 10 is able to compute the relative orientation of the camera 20 to the CRT 14 by measuring a system reference, such as a shadow mask (not shown), an aperture grill (not shown), or a display bezel 16. The optimum viewpoint is computed by iteratively transforming the measured reference data from camera pixel to 'flat plane' coordinates and comparing against known dimensions of the reference. The dimensions of the reference are obtained through the RS-232 communication link 30 with the monitor or from previously stored data such as on computer disk as discussed above.

In this way, the system 10 does not rely on precise fixturing since the viewpoint is computed each time a CRT is placed in front of the camera 20 for testing. Low tolerance fixturing may still be desired to ensure placement within the field of view of the camera or to eliminate vibration of a conveyor belt.

Definitions

In order for the results to be meaningful, some definitions must first be presented.

Coordinate System

Figure 2A:
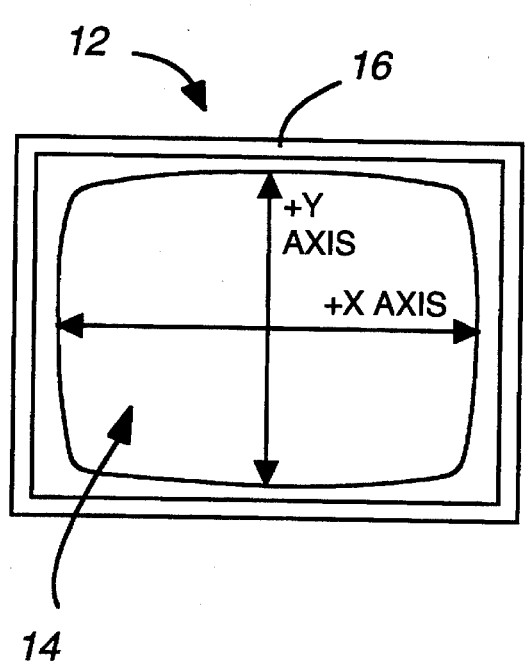
FIG. 2A is a front view and FIG. 2B is a cross-sectional view of the video monitor of FIG. 1, defining coordinate systems therefor.
Figure 2B:
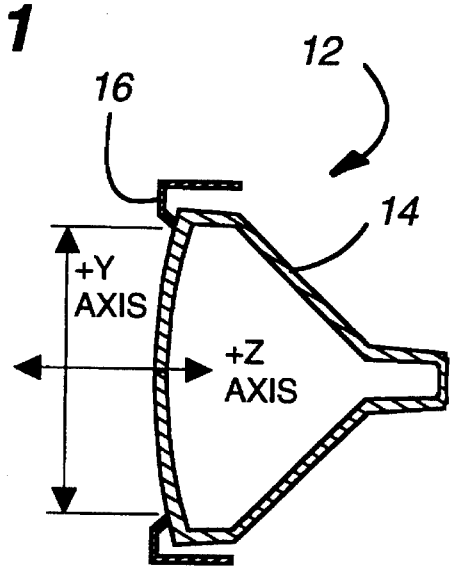

The 3D and 'flat plane' coordinates are shown on the CRT display in FIGS. 2A and 2B. The coordinate system is cartesian (x,y,z). The origin (0,0,0) is located on the front surface of the CRT where the axis of the CRT passes through the faceplate. The X axis passes horizontally across the front of the CRT, the Y axis passes vertically across the front of the CRT and the Z axis passes horizontally out of the CRT.

Notation

Vectors are indicated in Bold, scaler quantities are not. For example, the camera position is indicated by vc= (vc$_x$, vc$_y$, vc$_z$). Vector cross products are denoted by x and dot products by ●.

Camera Pixel Coordinates

Camera Pixel coordinates are located on the image plane of the camera sensor array. They will typically range from −320 ←cp$_x$←−319, −240←cp$_y$←−239 for a 640×480 array. The origin is where the camera lens optical axis passes through the sensor array.

Viewpoint

The camera is considered to be located at a single point described by a vector from the origin, vt. The direction that the camera is pointing is described by a unit length vector, cpt. The horizontal pixel axis of the camera is described by a unit length vector, cx. Note that cx is perpendicular to cpt. The vertical pixel axis of the camera is described by a unit length vector, cy=cx×opt. Only three vectors are needed to totally describe the relative orientation of the camera to display, vc, cpt, cx, which are computed as discussed above.

Models and Transformations

Tube Surface Models

A tube surface model is a description of the z coordinate of the phosphor or tube surface, as a function of (x,y). A surface may be described as having simple or compound radii in the x and y directions. A surface may also be described by an explicit formula where the parameters describe the shape of the surface. For brevity, only the explicit formula is shown, with parameters a$_0$ ... $_6$.

$$\text{surface\_hgt}(p)=a_0[p_x]^{a_1}+a_2[p_y]^{a_3}+a_4[P_x]a\,5[P_y]^{a6}$$

Figure 3:
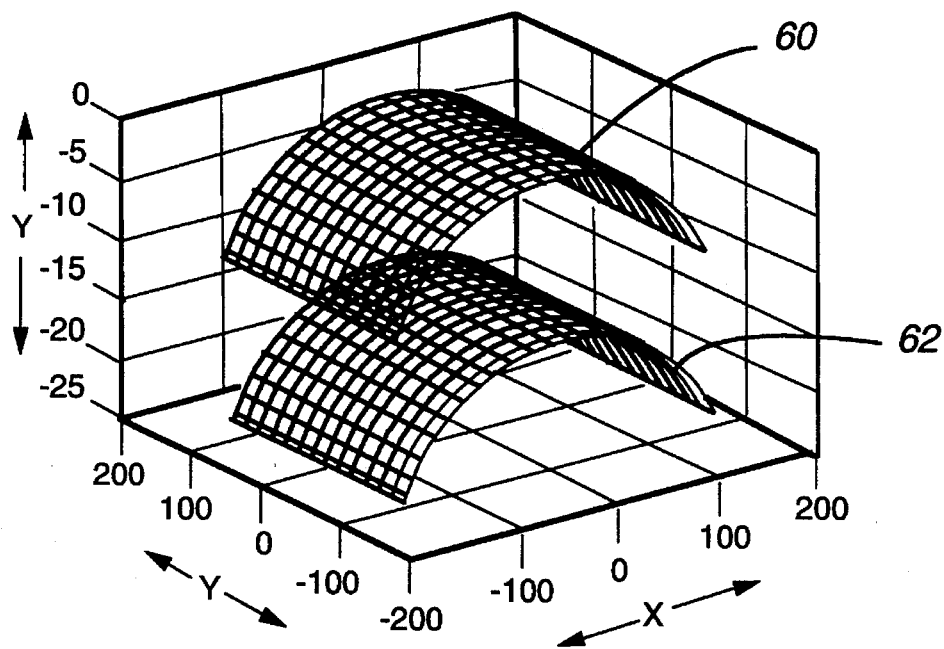
FIG. 3 is a graphical illustration of the relative position and shape of the surface of a particular cathode ray tube as an example and the location of the phosphor in the cathode ray tube in the video monitor of FIG. 1.

FIG. 3 shows an example of the surface_hgt() 60 and phosphor_hgt() 62 of a simple radius 17" CRT. Other models and sizes will have different data. In this example, the surface radii are r$_x$=1,300 mm and r$_y$=40,000 mm.

Camera Pixel to 'Flat Plane' Transformation

Figure 4:
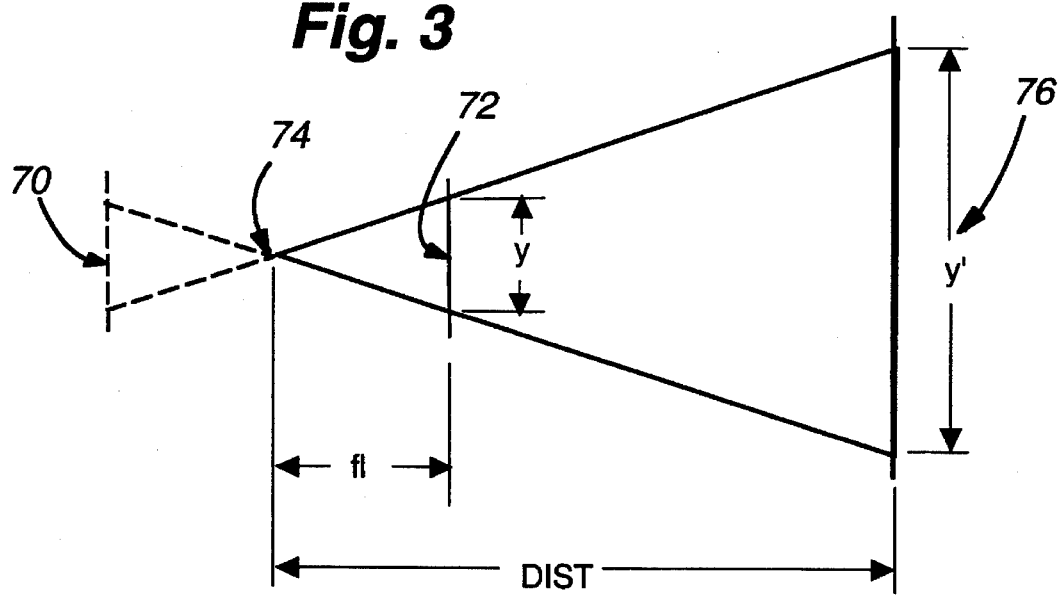
FIG. 4 is an illustration of the geometry involved in the transformation from camera pixels to target size by the system of FIG. 1.

The transformation from camera pixel to 'flat plane' coordinates may be described by a set of vector equations. The solution of these equations may be done numerically. Portions may be solved in an iterative manner. But first, a simple example which demonstrates one of the important principles of the transformation is presented. FIG. 4 shows a simplified geometry of the transformation from camera pixels to target size, y' in millimeters The lens focal length, fl, and distance to target, dist, are known.

In FIG. 4, the location of the actual image plane 70 is shown with dotted lines. In these transformations, a principle of similar triangles is used. Mathematically one says that the image plane 70 is located at the line indicated as the virtual image plane 72, which is an equal distance on the other side of the camera position 74. So to compute the distance y' which is the height 76 of some portion of the image, a simple relation holds, y'=y·dist/fl. The distance y may be the number of camera pixels between two image edges times the millimeter spacing per pixel on the sensor array.

So, for example, if one has a system where dist=600 mm, fl=16 mm, y=240 pixels·0.0135 mm/pix, then y'=121.5 mm. But if the distance is in error by 1 mm then the computed target size will be in error by 0.2 mm.

Figure 5:
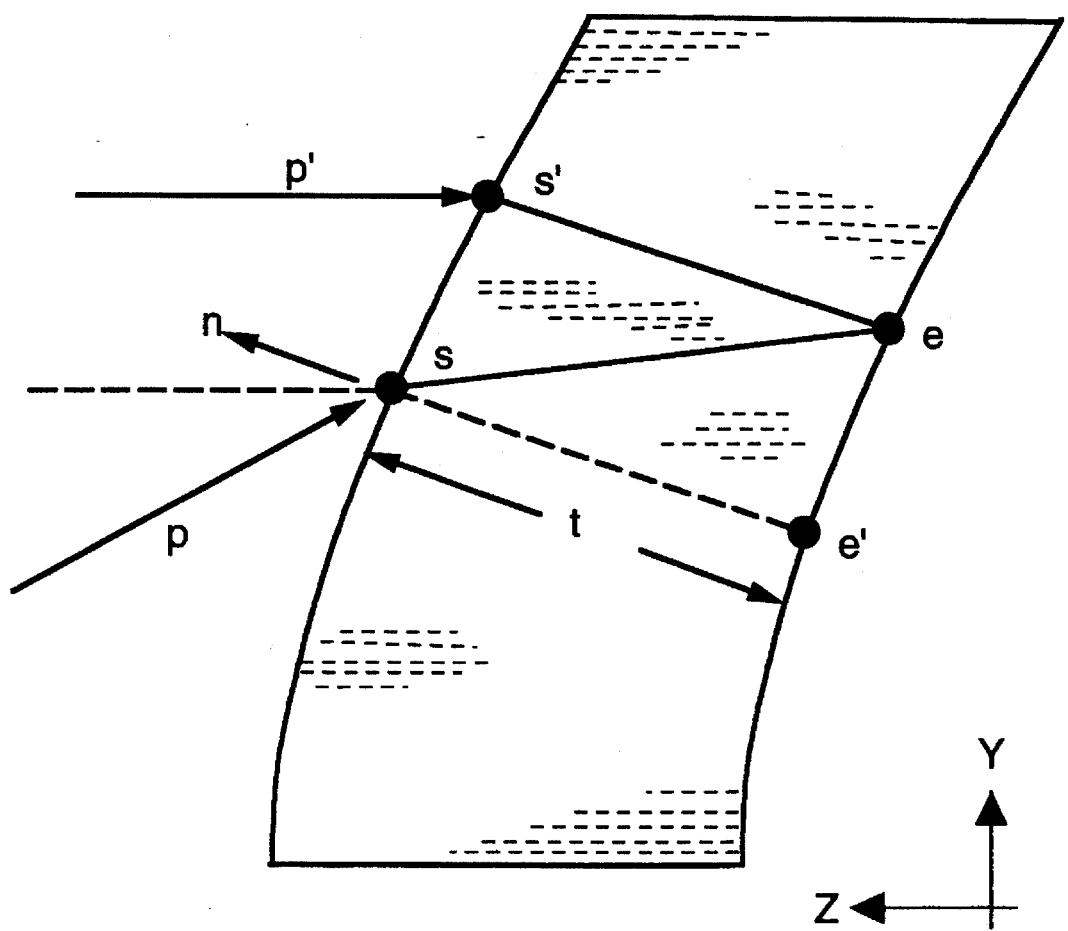
FIG. 5 is an enlarged cross-sectional view of a portion of the cathode ray tube of the video monitor in FIG. 1, showing the tracing of a ray of light through the tube's faceplate to illustrate the parallax between a view from an infinite distance and a view from the camera position.

FIG. 5 shows the ray traces through the tube's faceplate. This shows the parallax between a view from infinity and from the camera position. Since the actual geometry of measuring a CRT involves objects in three dimensions, vector equations must be used. Here are a few more definitions.

(cP$_x$, cp$_y$) camera pixel coordinates to be transformed to 'flat plane' coordinates.

$mmp_x, mmp_y$ millimeters per pixel, spacing between camera pixels in sensor array.

fl focal length of the lens in millimeters.

n unit vector normal to tube surface at point s, points out. The transformation begins by finding a vector p pointing from the camera position vc towards the feature being measured. This vector p is pointed along what is called the camera viewing ray.

$$p = fl \bullet cpt + mmp_x \cdot cp_x \bullet cx + mmp_y \cdot cpy \bullet cy$$

Find the point s on the surface of the tube where the viewing ray passes through. The last two of these equations are resolved iteratively.

$S_z = 0$
$s = vc - p \bullet (vc_z - s_z)/p_z$
$s_z = surface_{13} \_hgt(s)$

Compute a vector which is normal to the surface of the tube at the point s. This is a unit length vector.

$n = normal_{13}vect(s)$

Find the thickness t of the glass at point s, parallel to n. Thickness t is the distance from s to e'.

$$t = n_z \bullet (surface\_hgt(s) - phosphor\_hgt(s))$$

Trace the ray to the point on the phosphor $\bullet$ that generated the feature. Take into account the index of refraction of the tube glass, $n_g$. Make p1 a unit length vector in the direction of p.

$$p1 = p/|p|$$

Note that the magnitude of the cross product of $|p1 \times n| = \sin\theta$, where $\theta$ is the angle of incidence of the viewing ray p to the glass surface. Recall that the index of refraction formula may be written as $n_1 \sin\theta_2 = n_2 \sin\theta_1$. The next three equations take into account the effect of index of refraction. The result is a unit length vector p3 pointing from s to e.

$$p2 = -(p1 \times n) \times n/n_g$$

$$p3 = p2 - n \cdot sqrt(1 - p2 \cdot p2)$$

Now compute e, the point on the phosphor where the video image is actually generated.

$$e = s - t \cdot p3/(p3 \cdot n)$$

In order to compute the amount of parallax due to glass thickness, postulate a viewpoint from infinity where the viewing vector p' is parallel to the z axis. Compute a virtual point e' on the phosphor, as if the camera were located at infinity, and the viewing ray still passed through s.

$p' = (0, 0, -1.0)$ $p2' = -(p' \times n) \times n/n_g$ $p3' = p2' - n \cdot sqrt(1 - p2' \bullet p2')$ $e' = s - t \bullet p3'/(p3 \bullet n)$ Find the view from infinity point s' on the surface. This is an approximation, since we assume that in the region of s, the tube surface and phosphor are parallel, and glass thickness is constant.

$S' = S + e - e'$

The transformation from camera pixel coordinates $(cp_x, cp_y)$ to 'flat plane' coordinates $(s'_x, s'_y)$ is now complete.

$(cp_x, cp_y) \rightarrow (s'_x, s'_y)$

The reverse transformation follows similar methods and may be derived from these formulas.

Experimental Verification

Figure 6:
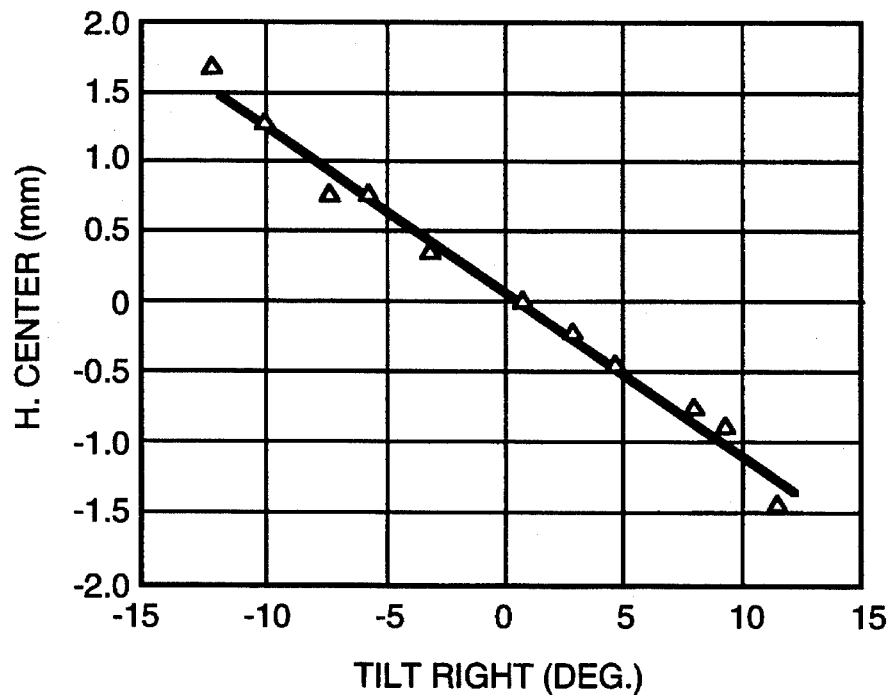
FIG. 6 is a graphical representation of an example of the error in horizontal center measurement versus camera monitor tilt angle when the system of FIG. 1 is not used.
Figure 7:
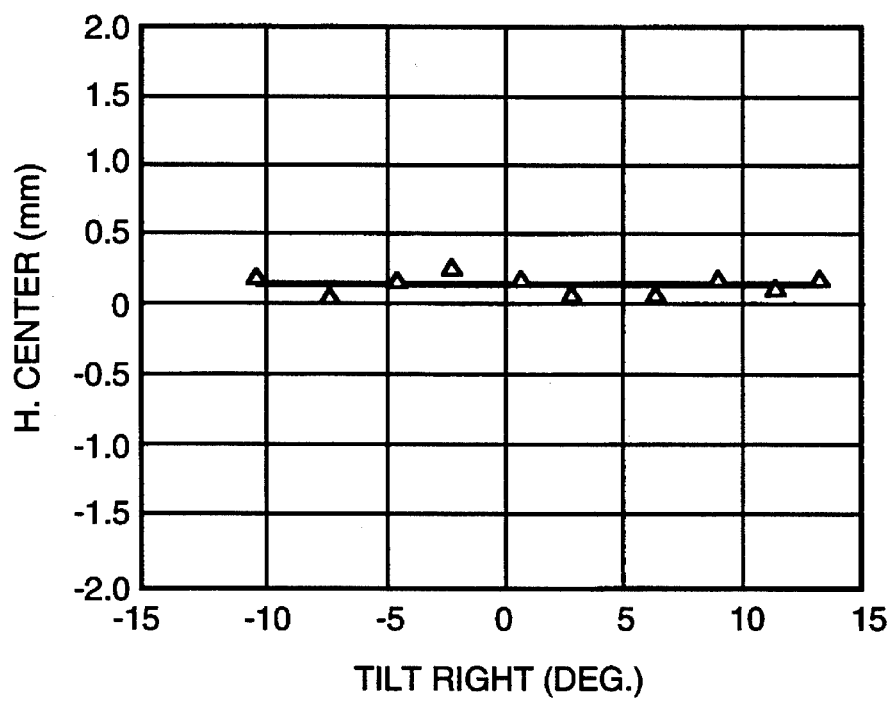
FIG. 7 is a graphical representation of an example of the error in horizontal center measurement versus camera monitor tilt angle when the system of FIG. 1 is used.

One example of the benefits of applying these models is demonstrated. The elimination of the effects of parallax is shown by measurements made on an exemplary 17" monitor. The horizontal center of a full white pattern is measured for a range of camera/monitor tilt angles. The monitor remained stationary, while the camera was placed in several positions from left to right. FIG. 6 shows how much the measured horizontal center changed as the camera/monitor orientation changed. This is due to parallax. The data for FIG. 6 was generated by effectively turning off the 3D modelling portion of the system of the present invention. FIG. 7 shows the measured horizontal center when the 3D models of the system are turned on, thus eliminating the effects of parallax.

Advantages

The ability to compute the viewpoint of the camera and transform edge locations from camera pixel to 'flat plane' coordinates yields multiple advantages in CRT inspection. Much less precise fixturing may be used in the placement of the CRT under test. For each display model, the inspection system change over is accomplished by loading in a new set of model parameters from disk, (e.g. surface_hgt(), phosphor_hgt(), $mmp_x$, $mmp_y$, fl, ...).

These transformations are necessary to allow a system of general design to correctly measure size, centering, and shape of video geometry of any CRT display. The effect of parallax is computed and removed so that the camera system may make accurate measurements from a wide range of positions.

Some of the motivation prompting this work has been to create a vision system of general design which may be applied to virtually any CRT based display. Only certain model parameters need be changed when setting up the system to inspect a particular CRT display.

A presently preferred embodiment of the present invention has been described above with a degree of specificity. It should be understood, however, that this degree of specificity is directed toward the preferred embodiment. The invention itself, however, is defined by the scope of the appended claims.

The invention claimed is:

1. A method for transforming X-Y spacial coordinates of portions of a camera-image, as captured by a video camera, into a video-monitor-referenced X-Y spacial coordinate system, comprising the steps of:

placing a video camera at a location to view a video monitor, the camera being located at an X-Y spacial position and alignment relative to the monitor;

using the video camera to capture a camera-image of the monitor;

said camera-image being indicative of the size and type of the monitor as a function of the X-Y spacial position and alignment of the camera relative to the monitor;

receiving monitor-configuration-data indicative of the actual size and type of monitor being viewed by the camera;

comparing the camera-image with the monitor-configuration-data;

determining the X-Y spacial position and alignment of the monitor relative to the camera from the comparison step; and utilizing the determined X-Y spacial position and alignment of the monitor relative to the camera to establish the video-monitor-referenced X-Y coordinate system.

2. The method of claim 1 including the steps of:

providing a video signal generator; and sending a video signal to the monitor to thereby provide display an image on the monitor.

3. The method of claim 1 wherein:

the monitor-configuration-data is received from the group the monitor and another source of monitor-configuration-data.

4. The method of claim 1 wherein said comparing step comprises the steps of:

iteratively transforming the camera-image into X-Y spacial coordinates; and comparing the transformed X-Y spacial coordinates to the monitor-configuration-data in order to determine an X-Y spacial coordinate viewpoint of the camera relative to the monitor.

5. The method of claim 1 wherein:

the monitor is of a physical size, includes a monitor glass having a physical shape and thickness, and includes a phosphor surface that is spaced from the monitor glass; and said monitor-configuration-data includes data selected from the group physical size of the monitor, thickness of the monitor glass, shape of the monitor glass, and spacing of the phosphor surface from the monitor glass.

6. The method of claim 5 wherein:

the monitor includes a vertically extending front CRT surface that is viewed by the camera;

the X axis of the X-Y spacial coordinate system passes horizontally across the front CRT surface;

the Y axis of the X-Y spacial coordinate system passes vertically across the front CRT surface; and the phosphor surface is spaced in a Z direction from the monitor glass.

7. Apparatus for transforming X-Y spacial coordinates of portions of a camera-image, as captured by a video camera, into a video-monitor-referenced X-Y spacial coordinate system, comprising:

a video monitor having a display surface that is oriented in an X-Y spacial coordinate system;

a video camera positioned and aligned in a given relative to said monitor so as to view said monitor and said display surface, said camera providing an output camera-image that includes an image of said monitor;

said camera-image being indicative of characteristics of said monitor whose values vary as a function of said camera positioning and alignment relative to said monitor;

a source of monitor-configuration-data that is indicative of actual values of said characteristics of said monitor;

first means for comparing said camera-image to said monitor-configuration-data and providing an output that is indicative of said comparison;

second means connected to said output of said first means for determining said camera positioning and alignment relative to said monitor, and providing an output indicative thereof; and third means connected to said output of said second means utilizing said determined camera positioning and alignment relative to said monitor for establishing said video-monitor-referenced X-Y coordinate system.

8. The apparatus of claim 7 including:

a video signal generator having an output signal; and means connection said signal generator output signal to said monitor to thereby provided a video-monitor-image on said display surface.

9. The apparatus of claim 7 wherein:

said monitor-configuration-data is received from a group comprising said monitor and another source of said monitor-configuration-data.

10. The method of claim 7 wherein:

said first means operates to iteratively transform said monitor-image into X-Y spacial coordinates, and compares said transformed X-Y spacial coordinates to said monitor-configuration-data in order to provide said first means output.

11. The apparatus of claim 7 wherein:

said monitor is of a physical size, includes a monitor glass having a physical shape and thickness, and includes a phosphor surface that is spaced from the monitor glass; and said monitor-configuration-data includes data selected from the group physical size of said monitor, thickness of said monitor glass, shape of said monitor glass, and spacing of said phosphor surface from said monitor glass.

12. The apparatus of claim 11 wherein:

said monitor includes a vertically extending front CRT surface that is viewed by said camera;

the X axis of said X-Y spacial coordinate system passes horizontally across said front CRT surface;

the Y axis of said X-Y spacial coordinate system passes vertically across said front CRT surface; and said phosphor surface is spaced in a Z direction from said monitor glass.

* * * * *

UNITED STATES PATENT AND TRADEMARK OFFICE
CERTIFICATE OF CORRECTION

PATENT NO. : 5,510,833
DATED : April 23, 1996
INVENTOR(S) : James R. Webb and Gregory A. Kern It is certified that error appears in the above-indentified patent and that said Letters Patent is hereby corrected as shown below:

Column 2, line 49, delete "O" and substitute therefor --OF--;
Column 3, line 64, delete "Mold" and substitute therefor --Bold--; and
Column 8, line 27, delete "method" and substitute therefor --apparatus--.

Signed and Sealed this

Twenty-sixth Day of November 1996

Attest:

BRUCE LEHMAN

Attesting Officer  Commissioner of Patents and Trademarks